United States Patent [19]

Turner

[11] Patent Number: 4,674,098

[45] Date of Patent: Jun. 16, 1987

[54] PROVIDING OF GASES FOR AN EXCIMER LASER

[76] Inventor: Robert Turner, P.O. Box 539, St. James, N.Y. 11780

[21] Appl. No.: 740,024

[22] Filed: May 31, 1985

Related U.S. Application Data

[63] Continuation-in-part of Ser. No. 605,772, May 1, 1984.

[51] Int. Cl.[4] ............................................. H01S 3/22
[52] U.S. Cl. ........................................ 372/59; 372/57; 372/60
[58] Field of Search ............................. 372/57, 58–60, 372/55

[56] References Cited

U.S. PATENT DOCUMENTS

| | | | |
|---|---|---|---|
| 4,259,645 | 3/1981 | Sze et al. | 372/57 |
| 4,259,646 | 3/1981 | Sze et al. | 372/57 |
| 4,301,425 | 11/1981 | Sze | 372/57 |

Primary Examiner—Leon Scott, Jr.
Attorney, Agent, or Firm—Roberts, Spiecens & Cohen

[57] ABSTRACT

A method of reducing an expenditure of a rare gas in an excimer laser system includes evacuating a lasing material including a mixture of diluent rare gas and removing therefrom halogen compounds. Supplemental lasing material is then added to the lasing mixture.

20 Claims, 2 Drawing Figures

CLOSED CYCLE EXCIMER LASER SYSTEM

PROVIDING OF GASES FOR AN EXCIMER LASER

REFERENCE TO RELATED APPLICATIONS

This application is a continuation-in-part of my copending application Ser. No. 605,772, filed May 1, 1984.

BACKGROUND OF THE INVENTION

This invention pertains to excimer lasers and more particularly to the conversation of the gases used in an excimer laser.

One of the most successful new laser technologies to have emerged in recent years is a new family of powerful gas lasers called excimer lasers. These lasers are unique in that they are efficient sources of high powered ultra-violet light. This property makes these lasers very useful for a wide range of scientific as well as industrial and military operations.

An economic limitation to the long-term use of laser of excimer lasers had been the high cost of operation. A significant portion of this cost has been due to the consumption of expensive rare gases such as krypton, argon or xenon as well as moderately expensive gases such as helium and neon. Ordinarily, the lasing gas mixture which is a combination of a heavy rare gas, a diluent gas and a halogen gas is fed into the laser and withdrawn from the laser after the lasing has been performed. Because of the cost of the rare gases, the excimer laser can be expensive to operate. However, the present inventor was part of a team which developed a closed-cycle recirculating system for rare gas halide excimer lasers. The results of this invention were published in Applied Physics Letters, Volume 32 (5) on Mar. 1, 1978, starting on page 291 thereof. (This idea is also discussed in Excimer Laser Chemical Problems, Los Alamos National Laboratory document Number Q-8-L-169..) While the proposed system has performed admirably to reduce the cost of the gases by virtue of the fact that the heavy rare gases are cleaned and recirculated after the removal of the halogen and fed back to the laser along with fresh halogen gas, there is a safety problem with such a system when pure halogen gas is used. This is because Halogens are poisonous gases in concentrations greater than 0.1–1 ppm. Furthermore, Halogens are very corrosive. In fact, pure flourine gas is very pyrophoric, and the greater the concentration, the greater the chance for cuasing a fire. If the source of the halogen is hydrogen chloride, then there are similar problems. Therefore, excimer laser users tend to use the halogen gas in a dilute form with a diluent gas such as helium. The gas mixtures of halogens and diluent gases are available from sources who have the equipment and knowhow to safely handle the halogens so the laser users do not have to use pure halogens. Nevertheless, in a closed cleanup and recirculation system the feeding of this dilute halogen gas mixture causes a raising of the pressure of the system, since the diluent gas is not removed from the gas stream by the cleanup process. This then requires that the system be vented in order to maintain constant laser pressure. In the course of venting, the proportions of the rare gases will change, as the halogen diluent flushes out the initial gas mixture. This will cause laser performance to deteriorate. The alternative to venting the gas mixture is to use a helium diffuser to selectively remove excess helium. For the gas flow rates encountered in excimer laser cleanup systems, a helium diffuser would have to provide very high rates of diffusion such that the diffusion system would be large, expensive, and probably very fragile, adding little to the overall safety of the system.

BRIEF SUMMARY OF THE INVENTION

It is accordingly a general object of the invention to further minimize the cost of operation of an excimer laser.

It is another object of the invention to reduce the consumption of rare gases in an excimer laser.

It is a further object of the invention to provide for safe replenishing of halogen gases in an excimer laser.

Briefly, the invention contemplates in an excimer laser system utilizing in a laser chamber a lasing material of a mixture of a diluent rare gas, a heavy rare gas and a halgen gas in given percentages, a method of reducing the expenditure of the rare gases. This method contemplates continuously evacuating the lasing material from the laser chamber, removing from the evacuated lasing mixture any halogen compounds and any other non-rare gas material to provide a cleaned lasing mixture and thereafter feeding the cleaned lasing mixture back into the lasing chamber and adding into the lasing mixture a supplemental lasing material comprising a mixture of halogen gas, diluent gas and the heavy rare gas. The percentage of halogen gas in the supplemental mixture is substantially greater than the percentage given in the lasing mixture and in the range of 3% to 15% and the percentages of the diluent rare gas and the heavy rare gas have substantially the same percentage ratios as the ratio of the given operating lasing mixtures.

There is further contemplated a supplemental lasing gas for an excimer laser recycling system including a heavy rare gas in the range of 0.3% to 25% of the mixture, a diluent gas in the range of 60% to 97% of the mixture and a halogen in the range of 3% to 15% of the mixture.

BRIEF DESCRIPTION OF DRAWING

Other objects, the features and advantages of the invention will be apparent from the following detailed description when read in conjunction with the accompanying drawings.

In the drawing.

DETAILED DESCRIPTION

Figure 1:
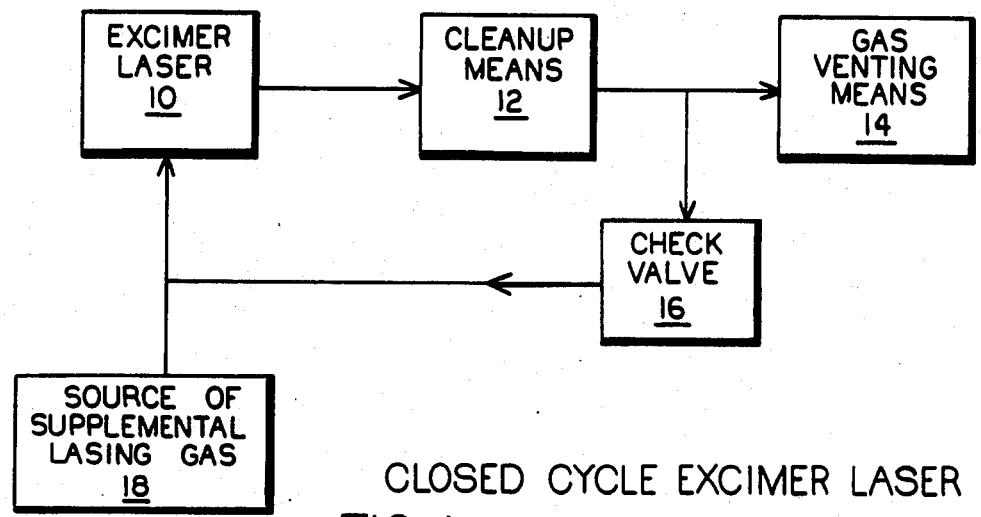
FIG. 1 is a schematic block diagram of a closed-cycled excimer laser system utilizing the invention.
Figure 2:
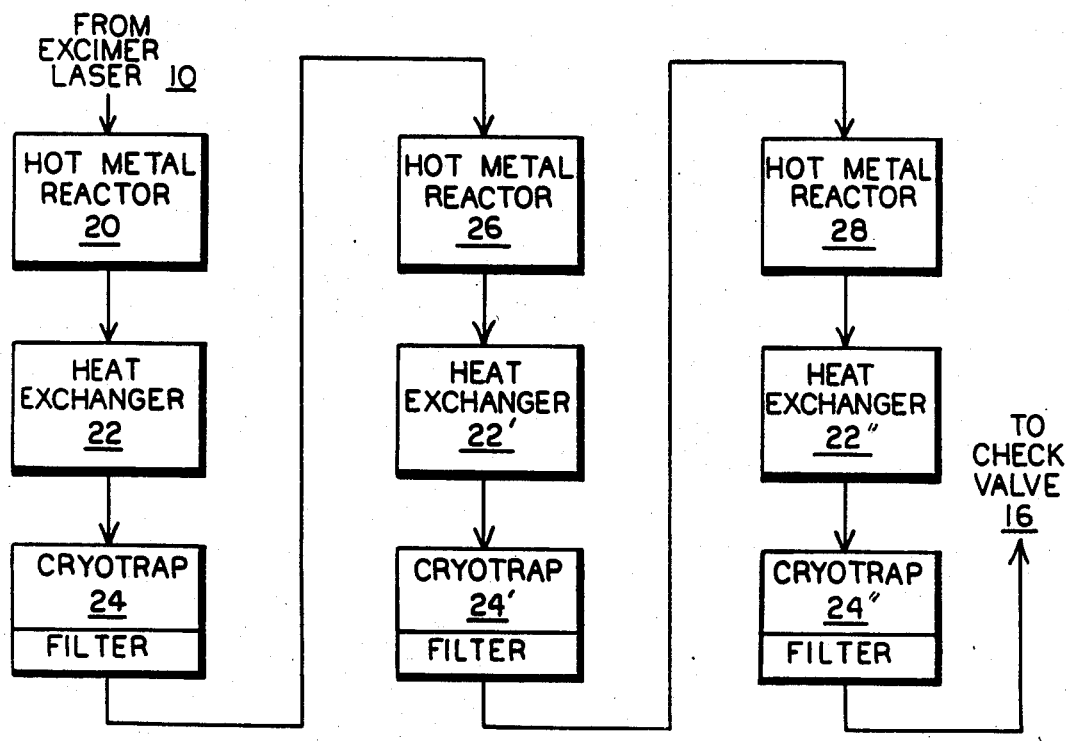
FIG. 2 is a schematic diagram of the cleanup means of the system of FIG. 1.

In FIG. 1 the closed-cycle excimer laser system centers around the excimer laser 10. The excimer laser 10 is a conventional design and in its lasing chamber has a gas mixture of a halogen, a heavy rare gas and a diluent rare gas. A typical lasing gas mixture would be a halogen gas such as flourine or gaseous hydrogen chloride in concentrations of 10ths of a percent, a heavy rare gas such as argon, krypton or xenon in concentrations of the order of 2 to 5 percent and a diluent range gas such as helium and/or neon in concentrations in the order of 95 percent. Because of the lasing action, there are formed gaseous and particulate compounds which if not removed from the laser will eventually reduce the efficiency of operation and finally quench any possible lasing action. Therefore, in accordance with the invention, the lasing mixture is exhausted or removed from the excimer laser 10 and passed through the cleanup means 12. In the cleanup means 12 the halogen compounds are removed from the gas mixture so that at the output of the cleanup means 12 there is a pure gas mixture of the heavy rare gas and the diluent rare gas. The cleaned gas mixture is fed via a check valve 16 back to the excimer laser 10. Since the halogen has been removed it is now necessary to replenish the gas mixture with the halogen gas. Accordingly, there is also fed into the input of the laser 10 a supplement gas mixture from the source 18. This gas mixture includes the halogen, the heavy rare gas and the diluent rare gas in percentages related to the original gas mixture. In particular, the halogen in the supplemental gas mixture is substantially greater in concentration than the original concentration. In particular, its percentage is at least one order of magnitude greater and typically 50 times greater. Thus, it is not unusual for the supplemental gas mixture to be in the order of 10 percent halogen. The remainder of the supplemental gas mixture is a combination of the heavy rare gas and the diluent rare gas. This combination has the same ratio of percentages as the ratio of percentages in the original gas mixture. For example, if the ratio in the original gas mixture of krypton and helium was say 5 percent to 95 percent or a ratio of 1 to 19, then the same ratio prevails in the supplemental gas mixture. Therefore, the ratio of krypton to helium in the supplemental gas mixture will be in the order of 4½ percent krypton and 85½ percent helium, (i.e., 90 percent rare gas). For the details see Table I of the appendix.

It should be noted that the introduction of this supplemental gas mixture raises the overall pressure of the system. Accordingly, it is necessary to vent the system when the pressure exceeds a given preset value. Therefore, interpose between the cleanup means 12 and a check valve 16 to prevent backflow, there is provided a gas venting means 14 which will open whenever the preset pressure is exceeded. This venting results in only a slight waste of the rare gases since very little supplemental gas mixture is required because of the high percentage of the halogen.

ment comprising adding to the fed back cleansed lasing mixture a supplemental lasing material comprising a gas mixture of the diluent rare gas, the heavy rare gas and the halogen gas, the percentage of halogen gas in the range of 3% to 15%, the percentage of diluent rare gas in the range of 60% to 97% and the percentage of heavy rare gas in the range of 0.3% to 25% of the mixture but with the percentages of the diluent rare gas to heavy rare gas being in substantially the same ratio of said given percentages of said rare gases.

2. A supplemental lasing gas mixture for a recycling excimer laser system comprising a heavy rare gas in the range of 0.3% to 25% of the mixture, a diluent gas in the range of 60% to 97% of the mixture and a halogen in the range of 3% to 15% of the mixture.

3. The gas mixture of claim 2 wherein the halogen is fluorine in the range of 5% to 10%.

4. The gas mixture of claim 3 wherein the heavy rare gas is krypton in the range of 3.5% to 7.0%.

5. The gas mixture of claim 3 wherein the heavy rare gas is krypton in the range of 4.0% to 5.0%.

6. The gas mixture of claim 3 wherein the heavy rare gas is argon in the range of 10% to 25%.

7. The gas mixture of claim 3 wherein the heavy rare gas is argon in the range of 12% to 20%

8. The gas mixture of claim 3 wherein the heavy rare gas is xenon in the range of 0.3% to 1.5%.

9. The gas mixture of claim 3 wherein the heavy rare gas is xenon in the range of 0.5% to 1.2%.

10. The gas mixture of claim 3 wherein fluorine is in the form of nitrogen trifluoride.

11. The gas mixture of claim 2 wherein the halogen is chlorine in the range of 5% to 10%.

12. The gas mixture of claim 11 wherein chlorine is in the form of hydrogen chloride.

13. The gas mixture of claim 11 wherein the heavy rare gas is krypton in the range of 3.5% to 7%.

14. The gas mixture of claim 11 wherein the heavy rare gas is krypton in the range of 4.0% to 5.0%.

15. The gas mixture of claim 11 wherein the heavy rare gas is argon in the range of 10% to 25%.

TABLE I

| MIXTURE PERCENTAGES OF GAS USED IN SUPPLEMENTAL LASING MIX | | | | |
|---|---|---|---|---|
| LASER TYPE | Kr F | Ar F | Xe F | Xe Cl |
| Heavy Rare Gas | Kr | Ar | Xe | Xe |
| % Usable | 3.5. to 7.0 | 10 to 25 | 0.3 to 1.5 | 0.5 to 5.0 |
| % Preferred | 4.0 to 5.0 | 12 to 20 | 0.5 to 1.2 | 0.8 to 3.0 |
| Diluent Rare Gas | He and/or Ne and/or Ar | He and/or Ne | He and/or Ne | He and/or Ne |
| % Usable | 78 to 94 | 60 to 85 | 83 to 97 | 80 to 97 |
| % Preferred | 85 to 91 | 70 to 83 | 88 to 95 | 87 to 95 |
| Halogen | $F_2$ | $F_2$ | $F_2$ or $NF_3$ | HCl or $Cl_2$ |
| % Usable | 3 to 15 | 3 to 15 | 3 to 15 | 3 to 15 |
| % Preferred | 5 to 10 | 5 to 10 | 5 to 10 | 5 to 10 |

I claim:

1. In a method for reducing the expenditure of a heavy rare gas in an excimer laser system utilizing in a laser chamber a lasing mixture of a diluent rare gas, a heavy rare gas and a halogen gas in given percentages which includes the steps of continuously evacuating the lasing mixture from the laser chamber, removing from the evacuated lasing mixture any halogen compounds formed by lasing action in the laser chamber to provide a cleansed lasing mixture and feeding the cleansed lasing mixture back into the laser chamber, the improve- 16. The gas mixture of claim 11 wherein the heavy rare gas is argon in the range of 12% to 20%.

17. The gas mixture of claim 11 wherein the heavy rare gas is xenon in the range of 0.3% to 1.5%.

18. The gas mixture of claim 11 wherein the heavy rare gas is xenon in the range of 0.5% to 1.2%.

19. The gas mixture of claim 3 wherein the diluent rare gas is in the group consisting of helium and neon.

20. The gas mixture of claim 11 wherein the diluent rare gas is in the group consisting of helium and neon.

* * * * *